United States Patent
Sarafianos et al.

(10) Patent No.: US 11,011,479 B2
(45) Date of Patent: May 18, 2021

(54) PROTECTED ELECTRONIC CHIP

(71) Applicant: STMicroelectronics (Rousset) SAS, Rousset (FR)

(72) Inventors: Alexandre Sarafianos, Pourrieres (FR); Bruno Nicolas, Aubagne (FR); Daniele Fronte, Rousset (FR)

(73) Assignee: STMICROELECTRONICS (ROUSSET) SAS, Rousset (FR)

( * ) Notice: Subject to any disclaimer, the term of this patent is extended or adjusted under 35 U.S.C. 154(b) by 13 days.

(21) Appl. No.: 16/503,876

(22) Filed: Jul. 5, 2019

(65) Prior Publication Data

US 2020/0020650 A1    Jan. 16, 2020

(30) Foreign Application Priority Data

Jul. 13, 2018   (FR) ........................... 1856507

(51) Int. Cl.
*H01L 23/00* (2006.01)

(52) U.S. Cl.
CPC .................. *H01L 23/576* (2013.01)

(58) Field of Classification Search
CPC ... H01L 23/576; H01L 23/58; H01L 27/0928; H01L 27/092; H01L 21/823892; G09C 1/00; H04L 9/004
See application file for complete search history.

(56) References Cited

U.S. PATENT DOCUMENTS

| | | | | |
|---|---|---|---|---|
| 5,021,860 A | * | 6/1991 | Bertotti | H01L 27/0248 257/552 |
| 5,475,273 A | * | 12/1995 | Paparo | H01L 27/0248 327/434 |
| 5,804,866 A | * | 9/1998 | Aiello | H01L 27/0248 257/566 |
| 6,235,602 B1 | * | 5/2001 | Yuzuriha | H01L 27/115 438/384 |
| 6,248,616 B1 | * | 6/2001 | Ravanelli | H01L 27/0248 257/E27.06 |
| 2012/0176161 A1 | * | 7/2012 | Petruzzi | H01L 27/0921 327/63 |
| 2017/0116439 A1 | | 4/2017 | Sarafianos et al. | |
| 2017/0301635 A1 | | 10/2017 | Sarafianos et al. | |
| 2017/0359544 A1 | * | 12/2017 | Kawaguchi | H04N 5/369 |
| 2019/0051723 A1 | | 2/2019 | Champeix et al. | |

FOREIGN PATENT DOCUMENTS

| | | |
|---|---|---|
| EP | 3159872 A1 | 4/2017 |
| EP | 3236496 A1 | 10/2017 |
| EP | 3301605 A1 | 4/2018 |

* cited by examiner

*Primary Examiner* — Sitaramarao S Yechuri
(74) *Attorney, Agent, or Firm* — Slater Matsil, LLP

(57) ABSTRACT

An electronic chip includes a first well having a first PN junction located therein, a second buried well located under and separated from the first well, and a first region forming a second PN junction with the second well. A detection circuit is coupled to the first well and configured to output a digital signal that has a first logic value when a potential difference within the first region is above a threshold and a second logic value when the potential difference within the first region is below the threshold.

20 Claims, 2 Drawing Sheets

PROTECTED ELECTRONIC CHIP

CROSS-REFERENCE TO RELATED APPLICATIONS

This application claims priority to French Patent Application No. 1856707, filed on Jul. 13, 2018, which application is hereby incorporated herein by reference.

TECHNICAL FIELD

The present disclosure generally concerns electronic chips or integrated circuit chips and, in particular embodiments, the protection of a chip against attacks.

BACKGROUND

Chips containing information, the access to which is reserved to authorized persons, such as bank card chips, are likely to be targeted by attacks.

Various types of attacks may be conducted from the back side of a chip, opposite to that where circuits containing the information are located. In a back side attack type, the attacker disturbs the operation of the circuits, by means of a laser or by applying against the back side a probe taken to a high voltage. In this last case, the potential of the probe may be positive or negative, for example, greater than several tens of volts, for example, greater than approximately 50 V. The attacker then deduces the coveted information from the effect of such disturbances, currently called "faults."

SUMMARY

An embodiment overcomes all or part of the disadvantages of known electronic chips. An embodiment overcomes all or part of the disadvantages of known devices of protection against attacks.

An embodiment provides an electronic chip comprising a first well having a first PN junction located therein, a second buried well located under and separated from the first well, a first region forming a second PN junction with the second well, and a circuit for supplying a first signal according to at least one potential difference within the first region.

According to an embodiment, the first region is located at least partly under the second well.

According to an embodiment, the first region is located on the second well.

According to an embodiment, the chip comprises at least one area of contact with the first region, coupled to the circuit.

According to an embodiment, the circuit is configured to compare a potential of the area of contact with the first region with a potential for biasing the first region.

According to an embodiment, the circuit is configured to supply a logic signal.

According to an embodiment, the chip comprises a second doped region forming a third PN junction with the second well, the circuit being configured so that the first signal is further a function of at least one potential difference within the second region.

According to an embodiment, the second region is located under and around the second well.

According to an embodiment, the circuit is configured to compare a potential of an area of contact with the second region with a potential for biasing the second region.

According to an embodiment, the circuit is configured to further supply a second signal according to at least one potential difference within the second well.

According to an embodiment, the circuit is configured to compare a potential of an area of contact with the second well with a potential for biasing the second well.

According to an embodiment, the area of contact with the second well extends vertically on top of and from a peripheral portion of the second well.

According to an embodiment, the area of contact with the second well forms on the second well a peripheral ring shaped wall.

According to an embodiment, the area of contact with the first well forms a pad on the second well.

According to an embodiment, the chip further comprises an additional buried well, located above and separated from the second well, forming an additional PN junction with the first well.

An embodiment provides a method of detecting an attack on an electronic chip, wherein a logic level of the first signal corresponds to an absence of attack.

According to an embodiment, a logic level of the second signal corresponds to an absence of attack.

The foregoing and other features and advantages will be discussed in detail in the following non-limiting description of specific embodiments in connection with the accompanying drawings.

DETAILED DESCRIPTION OF ILLUSTRATIVE EMBODIMENTS

Figure 1:
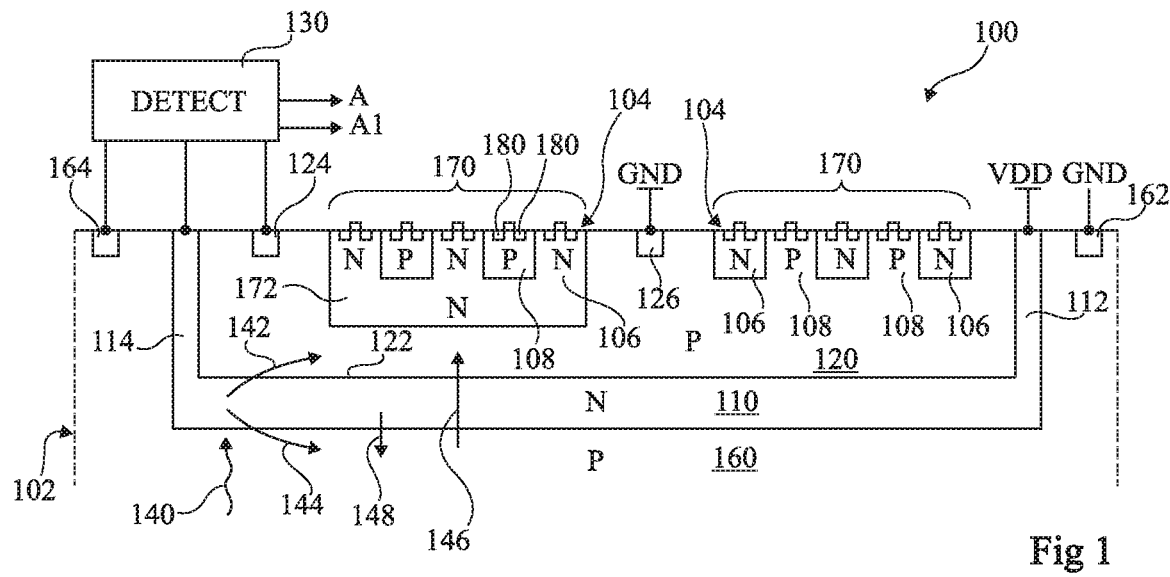
FIG. 1 is a partial simplified cross section view of an embodiment of an electronic chip.

The same elements have been designated with the same reference numerals in the different drawings. In particular, the structural and/or functional elements common to the different embodiments may be designated with the same reference numerals and may have identical structural, dimensional, and material properties.

For clarity, only those steps and elements which are useful to the understanding of the described embodiments have been shown and are detailed. In particular, electronic chip circuits are not shown, the described embodiments being compatible with most current circuits.

Throughout the present disclosure, the term "connected" is used to designate a direct electrical connection between circuit elements with no intermediate elements other than conductors, whereas the term "coupled" is used to designate an electrical connection between circuit elements that may be direct, or may be via one or more intermediate elements.

In the following description, when reference is made to terms qualifying absolute positions, such as terms "top," "bottom," "left," "right," etc., or relative positions, such as terms "above," "under," "upper," "lower," etc., or to terms qualifying directions, such as terms "horizontal," "vertical," etc., unless otherwise specified, it is referred to the orientation of the drawings.

The terms "about," "substantially" and "approximately" are used herein to designate a tolerance of plus or minus 10%, preferably of plus or minus 5%, of the value in question.

FIG. 1 is a partial simplified cross-section view of an embodiment of an electronic chip 100.

Chip 100 preferably comprises a semiconductor substrate 102, for example, made of silicon. Substrate 102 is, for example, P-type doped.

The chip comprises circuits of the chip to be protected against attacks. For example, the circuits comprise semiconductor components such as transistors 104. Transistors 104 are preferably formed inside and on top of adjacent wells 106 and 108 having alternated conductivity types. Wells 106 and 108 extend in substrate 102 from the upper surface thereof (located on the front side of the chip).

The chip further comprises a buried well 110, for example, N-type doped. N Well 110 is located under wells 106 and 108. N well 110 is topped, for example, at its periphery, with contact areas 112 and 114. Contact areas 112 and 114 are, for example, N-type doped wells which extend vertically from the front surface of the substrate to N well 110. Preferably, contact area 112 is coupled, for example, connected, to a node of application of a potential for biasing well 110, for example, a high power supply potential VDD.

Buried well 110 is separated from wells 106 and 108 by a P-type doped region 120 located on buried well 110. P region 120 is in contact with N well 110 and thus forms therewith a PN junction 122.

In a first embodiment, P region 120 continues all the way to the front surface of the substrate outside of wells 106 and 108. Areas 124 and 126 of contact with P region 120 are located outside of wells 106 and 108. Contact areas 124 and 126 are preferably areas more heavily P-type doped than P region 120. Contact area 124 is coupled to a circuit 130 (DETECT). Circuit 130 emits a signal A according to the potential difference between contact areas 124 and 126. Circuit 130 is preferably integrated inside and on top of the chip.

Preferably, contact area 126 is connected to a node of application of a potential for biasing region 120, for example, a reference potential such as that of ground GND. Signal A can then be obtained by comparing with a threshold Th1 the difference between the potential of area 124 and the biasing potential. As an example, signal A takes a high logic level when the potential of contact area 124 is greater than threshold Th1. Signal A may take a low logic level when this potential is smaller than threshold Th1.

In the absence of an attack, the potential of region 120 remains in the order of that of ground GND, and signal A has the low logic level.

During a back side attack attempt using a laser beam 140, the laser generates a current 142 through PN junction 122. Current 142 then heads towards contact area 126 coupled to ground. The flowing of current 142 through region 120, due to the electric resistance of this region, causes a potential difference between contact areas 124 and 126. The doping levels and the layout of regions 110 and 120 and of areas 124 and 126, as well as threshold Th1, are provided so that such a potential difference then exceeds threshold Th1, given the properties of the laser beam used. As an example, the laser beam has a wavelength in the range from 900 nm to 1,200 nm, an intensity, for example, in the range from 50 mW to 2,000 mW, and a diameter, for example, in the range from 1 micrometer to 30 micrometers. Signal A switches to the high logic level, thus corresponding to the detection of an attack.

The chip may thus be provided to verify, at the starting and/or in operation, that the value of signal A is the low logic level. This enables verification that there is no attack. When an attack causes the switching to the high logic level of signal A, the chip may be provided to take any usual countermeasure to counter the attack, such as stopping its operation or destroying information coveted by the attacker.

In a second embodiment, the region of substrate 102 located under well 110 (region 160) continues beyond the position above well 110, all the way to the front surface of the substrate. Areas 162 and 164 of contact with region 160 are located outside of the position above well 110. Contact area 164 is coupled to a circuit 130. Circuit 130 transmits a signal A according to the potential difference between contact areas 164 and 162. Preferably, contact area 162 is coupled to ground. As an example, signal A takes a high logic level when the potential of contact area 164 is greater than a threshold Th2. Signal A may take a low logic level when this potential is smaller than threshold Th2.

The operation is similar to that of the first embodiment. In case of a back side attack by a laser 140, a current 144 flows through the PN junction between well 110 and region 160. The current joins contact area 162 coupled to ground. Due to the resistance of the substrate, a potential difference is caused between contact areas 164 and 162, and signal A switches to the high logic value.

The first and second embodiments may be combined. The chip then comprises both areas 124 and 126 of contact with region 120, and areas 162 and 164 of contact with region 160. Contact areas 124 and 164 are coupled to circuit 130. Circuit 130 sets signal A to a high level if at least one of the potentials of contact areas 124 and 164 becomes greater than respective threshold Th1, Th2. Thresholds Th1 and Th2 may have the same value.

In case of an attack by application of a positive potential on the back side of the chip, the potential of contact area 164 rises, while that of region 162 remains the zero ground potential. Thereby, circuit 130 gives signal A a value corresponding to the detection of an attack, for example, a high logic level. Further, the stack of P region 160, of N well 110, and of P region 120 forms a transistor. As soon as the potential of region 160 in contact with well 110 exceeds potential VDD (to within the threshold voltage of the PN junction), this transistor turns on, and a current 146 flows from region 160 to region 120. This current reaches contact area 126, and the resistance of region 120 causes a rise in the potential of area 124, which enables to detect the attack.

In the above-described embodiments, area 114 of contact with buried well 110 is preferably coupled to circuit 130. Circuit 130 further supplies a signal A1 according to the potential difference between contact area 114 and contact area 112 (coupled to the node of application of high potential VDD). As an example, signal A1 has a high logic level when the potential of contact area 114 is greater than a threshold Th3, and a low logic level when contact area 114 has a potential smaller than threshold Th3. Threshold Th3 is, for example, in the range from the ground potential to potential VDD. As a variation, circuit 130 supplies signal A1 according to the potential difference between two areas 114 of contact with buried well 110.

In the absence of an attack, the potential of region 120 is in the order of VDD, and signal A1 has the high logic level.

In case of an attack by application of a high negative potential on the back side, the potential of contact area 114 becomes smaller than potential VDD. To achieve this, it may be provided for the PN junction between well 110 and region 160 to start an avalanche in case of such an attack. A current 148 then flows from well 110 to region 160. This current originates from contact area 112 at potential VDD and causes, due to the resistance of well 110, a potential difference within well 110. It may also be provided for such a potential difference to be due to the depletion of a portion of N well 110 located between contact areas 112 and 114. Signal A1 switches to the low logic level, which thus corresponds to the detection of an attack. The chip is provided to then take any countermeasure enabling to counter the attack.

Preferably, the chip is provided to take one or a plurality of countermeasures when signal A is at the high logic level as well as when signal A1 is at the low logic level. This enables to protect the chip against any back side attack by means of a laser or by application of a high positive or negative potential to the back side.

Contact areas 112 and 114 may be pads separate from each other. In a variation, contact areas 112 and 114 are portions of an N-type doped peripheral ring-shaped wall. The ring-shaped wall is, for example, located on top of and in contact with the periphery of well 110. P region 120 is then, for example, insulated from P region 160 by the ring shaped wall and thus defines a P well.

In the example shown in FIG. 1, wells 106 and 108 are located in one or a plurality of portions 170 of the chip. As an illustration, two portions 170 are shown and, in each portion 170, three N-type doped wells 106 alternate with two P-type doped wells 108. A number of wells different from that shown is possible, for example, a single well 108. In practice, the number of wells 106 and 108 may be high, for example, greater than 100. Area 126 may be located between two portions 170 or surrounded with a portion 170. As a variation, contact area 124 is located between two portions 170 or surrounded with a portion 170.

As an example, the chip comprises a buried well 172 located under and in contact with some of wells 106 and 108. In the shown example, buried well 110 is located under one of portions 170. The chip may comprise a plurality of buried wells 172 or comprise no buried well 172.

Each transistor 104 comprises doped areas 180 defining its source and its drain. Each doped area 180 has a conductivity type opposite to that of well 106 or 108 having the doped area located therein. This forms a PN junction in the concerned well 106 or 108. As a variation, such a PN junction may be formed by any component, such as a diode or a thyristor, comprising doped areas located in the well and having a conductivity type opposite to that of the well.

Preferably, wells 106 and 108 reach in substrate 102 a depth, for example, in the range from approximately 0.5 micrometer to approximately 2 micrometers, for example, in the order of 1 micrometer. Buried well 172 preferably has a thickness in the range from approximately 0.5 micrometers to approximately 2 micrometers, for example, in the order of 1 micrometer. The buried well is preferably located at depths in the order of a few micrometers. Buried well 110 preferably has an upper level located at a depth, for example, in the range from approximately 3 micrometers to approximately 10 micrometers, for example, from 3 micrometers to 10 micrometers. The buried well preferably has a thickness in the range from approximately 1 micrometer to approximately 4 micrometers, for example, from 1 micrometer to 4 micrometers.

Figure 2:
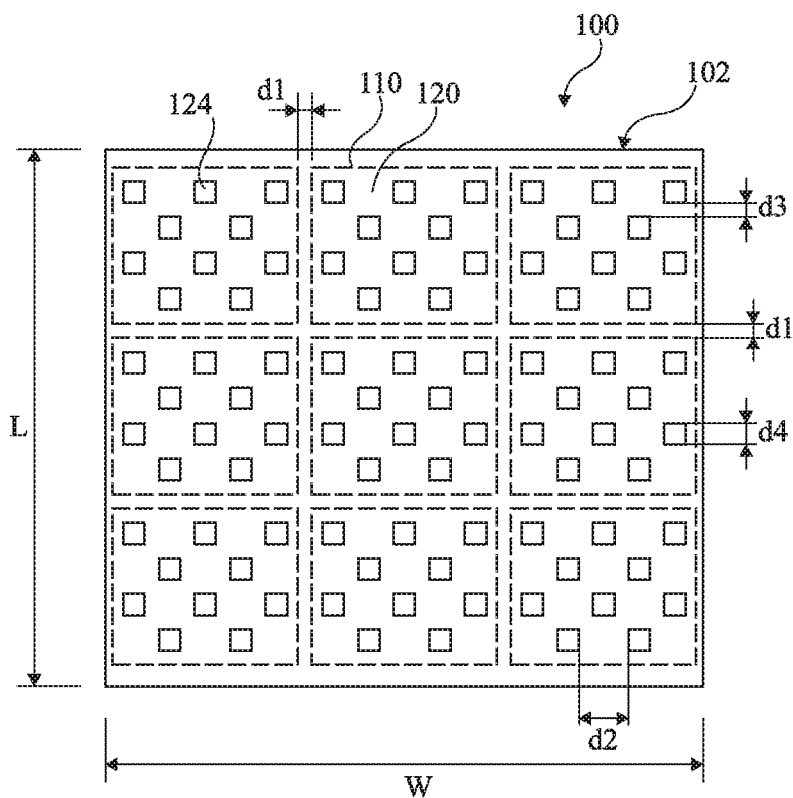
FIG. 2 is a partial simplified top view of an embodiment of an electronic chip.

FIG. 2 is a partial simplified top view of an embodiment of an electronic chip. The chip of FIG. 2 comprises elements identical or similar to those of the chip of FIG. 1, arranged identically or similarly.

In a portion of substrate 102, the chip comprises a plurality of buried wells 110, preferably arranged in an array. Nine wells 110 are shown as an example, other numbers of wells 110 being possible. Preferably, each well 110 seen from above has a rectangular or square shape. Distances d1 separating neighboring wells are preferably in the range from 2 micrometers to 4 micrometers, for example, in the order of 3 micrometers. Distances d1 are shown at an exaggerated scale as compared with that of wells 110 and of substrate 102.

The portion of substrate 102 comprising wells 110, for example, has a length L and a width W. Preferably, length L is in the range from 0.5 mm to 2 mm, for example, in the order of 1 mm. Preferably, width W is in the range from 0.5 mm to 2 mm, for example, in the order of 1 mm. Preferably, the substrate portion thus defined is square-shaped.

The chip comprises a plurality of areas 124 of contact with regions 120 covering regions 110. In the illustrated example, the chip comprises ten contact areas 124 above each buried well 110. As an example, contact areas 124 are arranged in quincunx, in rows. Preferably, neighboring contact areas 124, for example, located in a same row, are separated by a distance d2 in the range from 75 micrometers to 150 micrometers, for example, in the order of 100 micrometers. The rows are separated by a distance d3, for example, in the range from 30 micrometers to 70 micrometers, for example, in the order of 50 micrometers. Contact areas 124 have in top view, for example, the shape of squares. Preferably, length d4 of the square sides is in the range from 2 micrometers to 4 micrometers, for example, in the order of 3 micrometers. Lengths d4 are shown at a scale exaggerated as compared with that of wells 110 and of substrate 102.

Each contact area 124 is coupled to circuit 130, not shown in FIG. 2. Preferably, circuit 130 is configured to give signal A a value corresponding to an attack detection when the potential of at least one of areas 124 is greater than a threshold. Attacks which occur at any position on the back side can thus be detected.

According to an advantage, pads 124 and the distances between buried wells 110 enable to protect the chip circuits by using a particularly small substrate surface area, for example, smaller than 3% of the substrate surface area.

Figure 3:
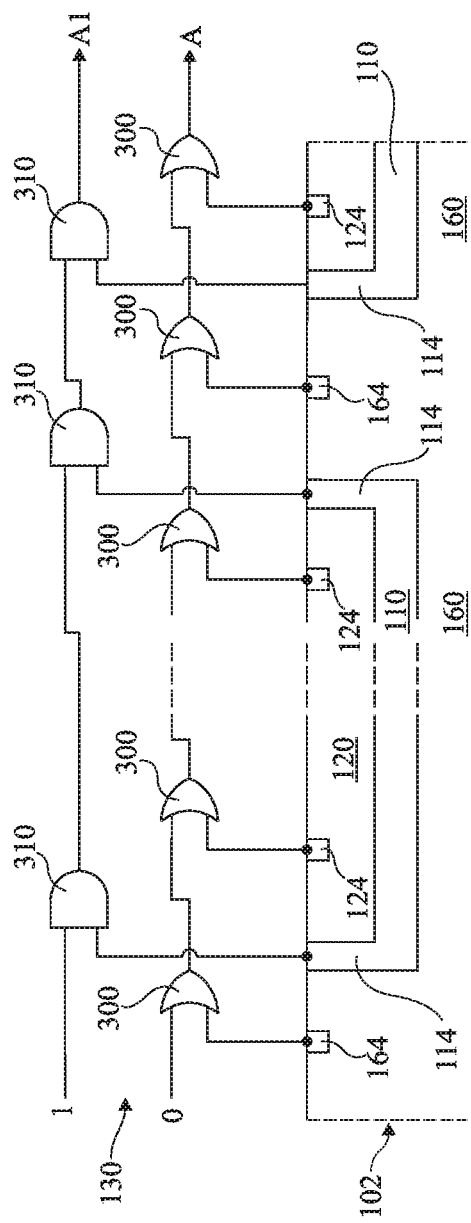
FIG. 3 schematically shows in cross-section view a portion of an embodiment of an electronic chip associated with a detection circuit.

FIG. 3 schematically shows in cross-section view a portion of an embodiment of an electronic chip associated with an example of circuit 130. The chip of FIG. 3 comprises elements identical or similar to those of the chip of FIG. 1, arranged identically or similarly.

As an example, the chip comprises a plurality of buried wells 110. The chip, for example, comprises a plurality of areas 164 of contact with regions 160 of substrate 102 located under wells 110. Some of contact areas 164 may be located between neighboring wells 110. Preferably, the chip comprises a plurality of areas 124 of contact with region 120 located above each buried well 110.

Circuit 130 comprises a chain of logic OR gates 300. Each OR gate 300 has a first and a second input. Each OR gate 300 other than the last gate in the chain, has its output coupled, for example, connected, to the first input of the next OR gate. The first input of the first OR gate in the chain is coupled to a node 'o' of application of a low logic level, for example, the ground. The last OR gate in the chain supplies signal A. Each of contact areas 164 and 124 is coupled, for example, connected, to one of the second inputs of OR gates 300.

The signal A thus obtained switches to the high logic level as soon as the potential of a single one of contact areas 124 or 164 exceeds a threshold. The threshold is here between the potentials of the low and high logic levels. Attacks conducted from various positions on the back side are thus detected.

According to an advantage, logic OR gates 300 may then be arranged to avoid tracks coupling each contact area to a same location of the chip, for example, tracks coupling the contact areas to the inputs of a common OR gate.

Preferably, the chip further comprises a plurality of areas 114 of contact with buried wells 110, possibly on each buried well 110. Contact areas 114 are, for example, distributed at the periphery of buried well 110.

Circuit 130 may then further comprise a chain of logic AND gates 310. Each AND gate 310 has a first and a second input. Each AND gate 310 other than the last gate in the chain has its output coupled, for example, connected, to the first input of the next AND gate. The first input of the first AND gate in the chain is coupled to a node '1' of application of a high logic level, for example, potential VDD. The last AND gate in the chain supplies signal A1. Each of contact areas 114 is coupled, for example, connected, to one of the second inputs of AND gates 310.

The signal A1 thus obtained switches to the low logic level as soon as the potential of a single one of contact areas 114 is below a threshold. Attacks by application of a high negative potential at various positions on the back side are thus detected.

Various embodiments and variations have been described. It will be understood by those skilled in the art that certain characteristics of these various embodiments and variations may be combined, and other variations with occur to those skilled in the art. In particular, the doping types of the described embodiments may be inverted by exchanging the directions of the potential differences.

Finally, the practical implementation of the described embodiments and variations is within the abilities of those skilled in the art based on the functional indications given hereinabove.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. An electronic chip comprising:
a first well having a first PN junction located therein;
a second buried well located under and separated from the first well;
a first region forming a second PN junction with the second well; and
a detection circuit comprising a first input coupled to the first well and a second input coupled to the first region, the detection circuit being configured to output a digital signal that has a first logic value when a potential difference within the first region is above a threshold and a second logic value when the potential difference within the first region is below the threshold.

2. The electronic chip of claim 1, wherein the first region is located at least partly under the second well.

3. The electronic chip of claim 1, wherein the first region is located on the second well.

4. The electronic chip of claim 1, wherein a first portion of the first region is coupled to a bias potential and a second portion of the first region is coupled to the detection circuit, the detection circuit configured to compare a potential of the first portion with a potential of the second portion.

5. The electronic chip of claim 1, comprising a second doped region forming a third PN junction with the second well, the detection circuit being configured so that the digital signal is further a function of a potential difference within the second doped region.

6. The electronic chip of claim 5, wherein the second doped region is located under and around the second well.

7. The electronic chip of claim 5, wherein the detection circuit is configured to compare a potential of an area of contact with the second doped region with a potential for biasing the second doped region.

8. The electronic chip of claim 1, wherein the detection circuit is further configured to output a second digital signal that is a function of a potential difference within the second well.

9. The electronic chip of claim 8, wherein the detection circuit is configured to compare a potential of a first area of the second well with a potential that biases a second area of the second well.

10. The electronic chip of claim 1, further comprising an additional buried well located above and separated from the second well, the additional buried well forming an additional PN junction with the first well.

11. An electronic chip comprising:
a semiconductor region doped to a first conductivity type;
a first well region disposed within the semiconductor region, the first well region being doped to a second conductivity type opposite the first conductivity type;
a second well region disposed within the first well region, the second well region being doped to the first conductivity type; and
a voltage detector having a first input coupled to the semiconductor region, and a second input coupled to a region selected from the group consisting of the first well region and the second well region, the voltage detector having an attack detection output.

12. The electronic chip of claim 11, wherein the electronic chip comprises a ground terminal coupled to the semiconductor region and a detection terminal coupled to the semiconductor region and spaced from the ground terminal by the first well region, wherein the voltage detector includes a third input coupled to ground, and wherein the first input is coupled to the detection terminal.

13. The electronic chip of claim 11, wherein the electronic chip comprises a supply voltage terminal coupled to the first well region and a detection terminal coupled to the first well region and spaced from the supply voltage terminal by the second well region, wherein the voltage detector includes a third input coupled to the supply voltage terminal, and wherein the second input is coupled to the detection terminal.

14. The electronic chip of claim 11, wherein the electronic chip comprises a ground terminal coupled to the second well region and a detection terminal coupled to the second well region and spaced from the ground terminal, wherein the voltage detector includes a third input coupled to ground, and wherein the second input is coupled to the detection terminal.

15. The electronic chip of claim 14, wherein the electronic chip further comprises a third well region disposed within the second well region, the ground terminal being spaced from the detection terminal by the third well region.

16. The electronic chip of claim 11, wherein the electronic chip comprises:

a first ground terminal coupled to the semiconductor region;

a first detection terminal coupled to the semiconductor region and spaced from the first ground terminal by the first well region, a supply voltage terminal coupled to the first well region;

a second detection terminal coupled to the first well region and spaced from the supply voltage terminal by the second well region;

a second ground terminal coupled to the second well region; and a third detection terminal coupled to the second well region and spaced from the second ground terminal; and wherein the voltage detector includes a third input coupled to ground, a fourth input coupled to the supply voltage terminal, wherein the first input is coupled to the first detection terminal, wherein the second input is coupled to the second detection terminal, and wherein the voltage detector further includes a fifth input coupled to the third detection terminal.

17. The electronic chip of claim 11, further comprising a plurality of transistors disposed in the second well region.

18. A method of detecting an attack on an electronic chip that includes a first region of a first conductivity type within a second region of a second conductivity type opposite the first conductivity type, and a third region of the second conductivity type within the first region, the third region being located between a first portion of the first region and a second portion of the first region, the method comprising:

biasing the first portion of the first region with a supply voltage;

detecting a voltage at the second portion of the first region, the second portion being laterally spaced from the first portion;

determining that an attack is occurring when the difference between the detected voltage and the supply voltage is greater than a threshold voltage amount; and determining that no attack is occurring when the difference between the detected voltage and the supply voltage is less than the threshold voltage amount.

19. The method of claim 18, wherein the electronic chip includes a plurality of first regions that are spaced from one another, the method comprising biasing a first portion of each of the first regions with the supply voltage, detecting a voltage at a second portion of each of the first regions, and, for each of the first regions, determining whether an attack is occurring based upon a voltage difference between the detected voltage and the supply voltage.

20. The method of claim 18, wherein the electronic chip further includes a plurality of transistors within the first region, the method further comprising operating the transistors while determining whether or not an attack is occurring.

* * * * *